United States Patent Office 3,485,757

Patented Dec. 23, 1969

3,485,757

THERMOELECTRIC COMPOSITION COMPRISING DOPED BISMUTH TELLURIDE, SILICON AND BORON

Samuel S. Shapiro, Trenton, N.J.; may be granted to United States Atomic Energy Commission under the provisions of 42 U.S.C. 2182

No Drawing. Filed Nov. 23, 1964, Ser. No. 413,283
Int. Cl. H01b *1/06;* H01v *3/00;* H01l *3/02*
U.S. Cl. 252—62.3 4 Claims The present invention relates to a thermoelectric composition capable of use at higher temperatures than has formerly been the case, and in which the increase in resistivity at higher temperatures is greatly minimized.

Bismuth telluride allows (intermetallic compounds of bismuth and tellurium, often in combination with antimony, selenium and other substances) have long been used in thermoelectric applications for power generation and cooling purposes. One major limitation in the use of such materials is the maximum temperature to which they may be subjected. Hot side temperatures of 250° C. are generally considered the maximum in this regard. They suffer from the further significant drawback that their resistivity increases markedly as the temperature rises, usually by a factor of two when comparing resistivity at room temperature with resistivity at a high side temperature between 200° C. and 250° C. This increase in resistivity is undesirable, and constitutes a limitation on the thermoelectric efficiency of the thus constituted units. It is the prime object of the present invention to devise a thermoelectric composition of the bismuth telluride type which can be used at significantly higher temperatures than has heretofore been the case, and in which the increase in resistivity attendant upon increase in temperature on the hot side is markedly less than has been reluctantly accepted heretofore. More specifically, the composition of the present invention can be used with hot side temperatures of as much as 300° C. (a 20% improvement over the prior art), and with a resistivity increase 60% or more smaller than has formerly been considered attainable with such compositions.

These significantly improved operating results are achieved, in accordance with the present invention, by adding small amounts of silicon and/or boron to the otherwise conventional bismuth telluride compositions. No changes in the procedures involved in the production of the otherwise conventional thermoelectric bodies is involved, nor is any modification required of the equipment used in that regard. Since only very small amounts of silicon and/or boron need be used, it will be appreciated that the improved results attendant upon the present invention therefor are achieved with substantially no increase in cost.

A typical P-type bismuth antimony telluride alloy composition may be formed from the following formula:

| Formula No. 1: | G. |
|---|---|
| Bismuth | 9.614 |
| Tellurium | 38.283 |
| Antimony | 18.264 |
| Selenium | 1.184 |

A typical N-type bismuth antimony telluride thermoelectric composition is formed from the following formula:

| Formula No. 2: | G. |
|---|---|
| Bismuth | 20.006 |
| Tellurium | 18.185 |
| Antimony | .366 |
| Selenium | .592 |
| Iodoform | .05 |

Both of these typical formulations are characterized by the operating condition limitations set forth above—the temperature on the hot side should not exceed 250° C., and resistivity increases by a factor of about two when the temperature on the hot side rises from room temperature to approximately 200° C. The iodoform in Formula No. 2 is optional, and is an additive known to give rise, in N-type compositions of the type here involved, to an improvement in resistivity; it does not however, materially alter the resistivity-temperature characteristic of those compositions. Lead is known to have a comparable effect, in P-type compositions, to that which iodoform has in N-type compositions. Lead and iodoform may or may not be used, as desired, without appreciably affecting the action of the boron-silicon additions of the present invention in improving that resistivity-temperature characteristic.

The addition of silicon in an amount of .056 g. (approximately 2 atomic percent of the total composition) to Formula No. 1 produces a composition which may reliably be used with temperatures on the hot side of 300° C. and which exhibits the following resistivity characteristics: At room temperature the resistivity is 918 microohm-cm. With a temperature of 222° C. on the hot side and 10° C. on the cold side the resistivity is 1300 microohm-cm. This represents a resistivity increase only of approximately 42%, a significant improvement over the 100% increase characteristic of comparable prior art compositions. This improvement in temperature sensitivity does not adversely affect the other operating characteristics of the material. Thus the Seebeck coefficient, which was 190 microvolts/° C. at room temperature, was 215 microvolts/° C. at the higher temperatures specified.

When the composition of Formula No. 1 is modified by the addition thereto of .065 g. of boron (again approximately 2 atomic percent of the entire composition), the upper operating temperature limit is again raised to 300° C., and a room temperature resistivity of 578 microohm-cm. increased only to 700 microohm-cm. with a temperature of 230° C. on the hot side and a temperature of 10° C. on the cold side, the Seebeck coefficient being 150 microvolts/° C. at room temperature and 175 microvolts/° C. at the specified elevated temperatures.

When, to the material of Formula No. 2, comparable amounts of silicon and/or boron are added, again the maximum permissible operating temperature is increased to approximately 300° C. A room temperature resistivity of 616 microohm-cm. increased only to 700 microohm-cm. with a temperature of 230° C. on the hot side and 10° C. on the cold side, the Seebeck coeffcient going from 150 microvolts/° C. at room temperature to 170 microvolts/° C. at the elevated temperatures.

Comparable improvements in operating characteristics have been observed when the atomic percentage of the boron and/or silicon additive varies between ½–3%, with best results apparently being obtained when the atomic percentage is approximately 2%.

While but a limited number of specific embodiments are here disclosed it will be apparent that many variations may be made therein, all within the knowledge of those skilled in the art, without departing from the spirit of the present invention, as defined in the appended claims.

I claim:

1. A thermoelectric composition comprising bismuth telluride plus dopant in an amount sufficient to impart to said bismuth telluride a given conductivity type characteristic, and, in addition thereto, a member from the group consisting of elemental silicon and elemental boron and combinations thereof in atomic proportions from ½% to 3%, whereby the temperature-resistivity characteristics are improved without altering said givetn conductivity characteristic.

2. A thermoelectric composition comprising bismuth telluride plus dopant in an amount sufficient to impart to said bismuth telluride a given conductivity type characteristic, and, in addition thereto, a member from the group consisting of elemental silicon and elemental boron and combinations thereof in atomic proportions of about 2%, whereby the temperature-resistivity characteristics are improved without altering said given conductivity characteristic.

3. A thermoelectric composition comprising bismuth antimony telluride plus dopant in an amount sufficient to impart to said bismuth antimony telluride a given conductivity type characteristic, and, in addition thereto, a member from the group consisting of elemental silicon and elemental boron and combinations thereof in atomic proportions from ½% to 3%, whereby the temperature-resistivity characteristics are improved without altering said given conductivity characteristic.

4. A thermoelectric composition comprising bismuth antimony telluride plus dopant in an amount sufficient to impart to said bismuth antimony telluride a given conductivity type characteristic, and, in addition thereto, a member from the group consisting of elemental silicon and elemental boron and combintions thereof in atomic proportions of about 2%, whereby the temperature-resistivity characteristics are improved without altering said given conductivity characteristic.

References Cited

UNITED STATES PATENTS

| | | | |
|---|---|---|---|
| 2,788,382 | 4/1957 | Faus et al. | 136—240 X |
| 3,017,446 | 1/1962 | Goldsmid et al. | 136—238 X |
| 3,071,495 | 1/1963 | Hanlein | 136—238 X |
| 3,208,878 | 9/1965 | Donahoe | 136—238 X |
| 3,211,655 | 10/1965 | Fleischmann | 136—238 X |
| 3,211,656 | 10/1965 | Rupprecht | 136—238 X |
| 3,256,698 | 6/1966 | Henderson | 136—201 X |
| 3,256,699 | 6/1966 | Henderson | 136—239 X |
| 3,256,700 | 6/1966 | Henderson | 136—238 X |
| 3,256,702 | 6/1966 | Henderson | 136—238 X |

OTHER REFERENCES

Rosi et al.: J. Phys. Chem. Solids, vol. 10, No. 2–3, July 1959, pp. 191–200.

Smirnov et al.: Chem. Abs., vol. 59, No. 12, Abs. No. 14697h and title page, Dec. 9, 1963.

ALLEN B. CURTIS, Primary Examiner

U.S. Cl. X.R.

136—238, 239, 240